(12) United States Patent
Zhang et al.

(10) Patent No.: US 8,911,118 B2
(45) Date of Patent: Dec. 16, 2014

(54) LENS, LED MODULE AND ILLUMINATION SYSTEM HAVING SAME

(71) Applicants: Fawei Zhang, Ningbo (CN); Le Xu, Ningbo (CN); Wanjiong Lin, Ningbo (CN)

(72) Inventors: Fawei Zhang, Ningbo (CN); Le Xu, Ningbo (CN); Wanjiong Lin, Ningbo (CN)

(73) Assignee: Ningbo Hi-Tech Park Self Electronics Co., Ltd., Ningbo (TW)

( * ) Notice: Subject to any disclaimer, the term of this patent is extended or adjusted under 35 U.S.C. 154(b) by 1 day.

(21) Appl. No.: 14/010,162

(22) Filed: Aug. 26, 2013

(65) Prior Publication Data

US 2014/0071693 A1 Mar. 13, 2014

(51) Int. Cl.
| | |
|---|---|
| *F21V 7/00* | (2006.01) |
| *F21K 99/00* | (2010.01) |
| *F21V 13/04* | (2006.01) |
| *F21V 5/04* | (2006.01) |
| *F21V 5/08* | (2006.01) |
| *G02B 19/00* | (2006.01) |
| *F21W 131/405* | (2006.01) |
| *F21Y 101/02* | (2006.01) |

(52) U.S. Cl.
CPC . *F21K 9/50* (2013.01); *F21V 13/04* (2013.01); *F21V 5/04* (2013.01); *F21V 7/0091* (2013.01); *F21V 5/08* (2013.01); *G02B 19/0028* (2013.01); *G02B 19/0061* (2013.01); *F21W 2131/405* (2013.01); *F21Y 2101/02* (2013.01)
USPC . 362/309; 362/308; 362/311.02; 362/311.05; 359/720; 359/831; 359/833

(58) Field of Classification Search
CPC .............. F21V 13/04; F21V 5/04; F21V 5/08
USPC ........ 362/308, 309, 311.02, 311.05; 359/720, 359/707, 726, 831, 833, 837
See application file for complete search history.

(56) References Cited

U.S. PATENT DOCUMENTS

| | | | | |
|---|---|---|---|---|
| 2,908,197 | A * | 10/1959 | Wells et al. | 340/815.76 |
| 7,959,326 | B2 * | 6/2011 | Laporte | 362/249.02 |
| 8,292,474 | B2 * | 10/2012 | Ho et al. | 362/335 |
| 8,449,149 | B2 * | 5/2013 | Chang et al. | 362/311.06 |
| 2010/0073938 | A1 * | 3/2010 | Ho | 362/335 |
| 2011/0235338 | A1 * | 9/2011 | Chen et al. | 362/311.02 |
| 2013/0051030 | A1 * | 2/2013 | Lee et al. | 362/311.02 |

* cited by examiner

*Primary Examiner* — Ali Alavi
(74) *Attorney, Agent, or Firm* — Wang Law Firm, Inc.; Li K. Wang; Stephen Hsu

(57) ABSTRACT

An illumination system includes an LED module and an illuminated area. The LED module includes an LED, and a lens mounted in light path of the LED. The lens includes a light source recess, a first light emitting surface, a critical reflecting surface, and a second light emitting surface intersecting with the first light emitting surface and being on same side with the first light emitting surface. The first light emitting surface can receive more light quantity than the second light emitting surface. Although the light emitted from the first light emitting surface may have greater attenuation than the light emitted from the second light emitting surface, light emitted from the first light emitting surface can make up the intensity losses of attenuation as the first light emitting surface receives more light quantity than the second light emitting surface. As a result, the illumination system has a uniform illumination pattern.

19 Claims, 12 Drawing Sheets

LENS, LED MODULE AND ILLUMINATION SYSTEM HAVING SAME

RELATED APPLICATION

This application claims benefit of priority to Chinese Application CN201210359385.1, filed on Sep. 13, 2013 with the State Intellectual Property Office of the People's Republic of China.

BACKGROUND

1. Technical Field

The disclosure relates to electrical lighting devices, and more particularly to an illumination system providing an uniform illumination pattern, lens and LED module used in the illumination system.

2. Description of the Related Art

For years, people have used traditional incandescent or fluorescence lighting apparatus in order to address their interior lighting concerns. However, such lighting apparatus presents a number of drawbacks. For example, the popular halogen apparatus presents the following drawbacks, such as relatively high power consumption, inefficiency of light dispersion due to the placement of its metal shield in the line sight of the halogen bulb, and its limited effectiveness in preventing glare from the halogen bulb.

Recently, a number of LED lighting apparatuses have been designed to replace the halogen apparatus, as well as other traditional incandescent or fluorescence lighting apparatuses. But, due to mediocre light output, LED used in the past was primarily limited to applications where only small surface areas were illuminated. In these applications the light was concentrated into a narrow beam using an optic designed to take the wide angle light output of an LED and collimate it using a lens, discussed below with respect to FIG. 11. FIG. 11 shows a traditional light illumination system. The light illumination system includes an illuminated area 1, and a LED light module 2 positioned beside the illuminated area 1. The LED light module 2 has a light emitting surface 3 and light 4 emitted forward of the light emitting surface 3 illuminate the illuminated area 1. Understandably, regardless of where the LED light module 2 is disposed with relationship of the illuminated area 1, part of the light 4 illuminate the illuminated area 1 which is closer to the LED light module 2 and the other illuminate the illuminated area 1 which is farther to the LED light module 2. Since the performance of the above illumination is inevitable, part of the light 4, which illuminate the illuminate area 1 and is farther to the LED light module 2, has more attenuation than the other which illuminate the illuminate area 1 and is closer to the LED light module 2. However, the light 4 emitted from the light emitting surface 3 has same initial light intensity. As a result, the illumination value of the illuminated area 2 varies with the distance between the illumination area 1 and the LED light module 2. Examples of some applications of the light illumination system include exhibition hall, showcase, and so on. These new applications require different optical designs. In particular these applications require uniform illumination in the illumination area 2 for improving the sense of quality of the showed products to people.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
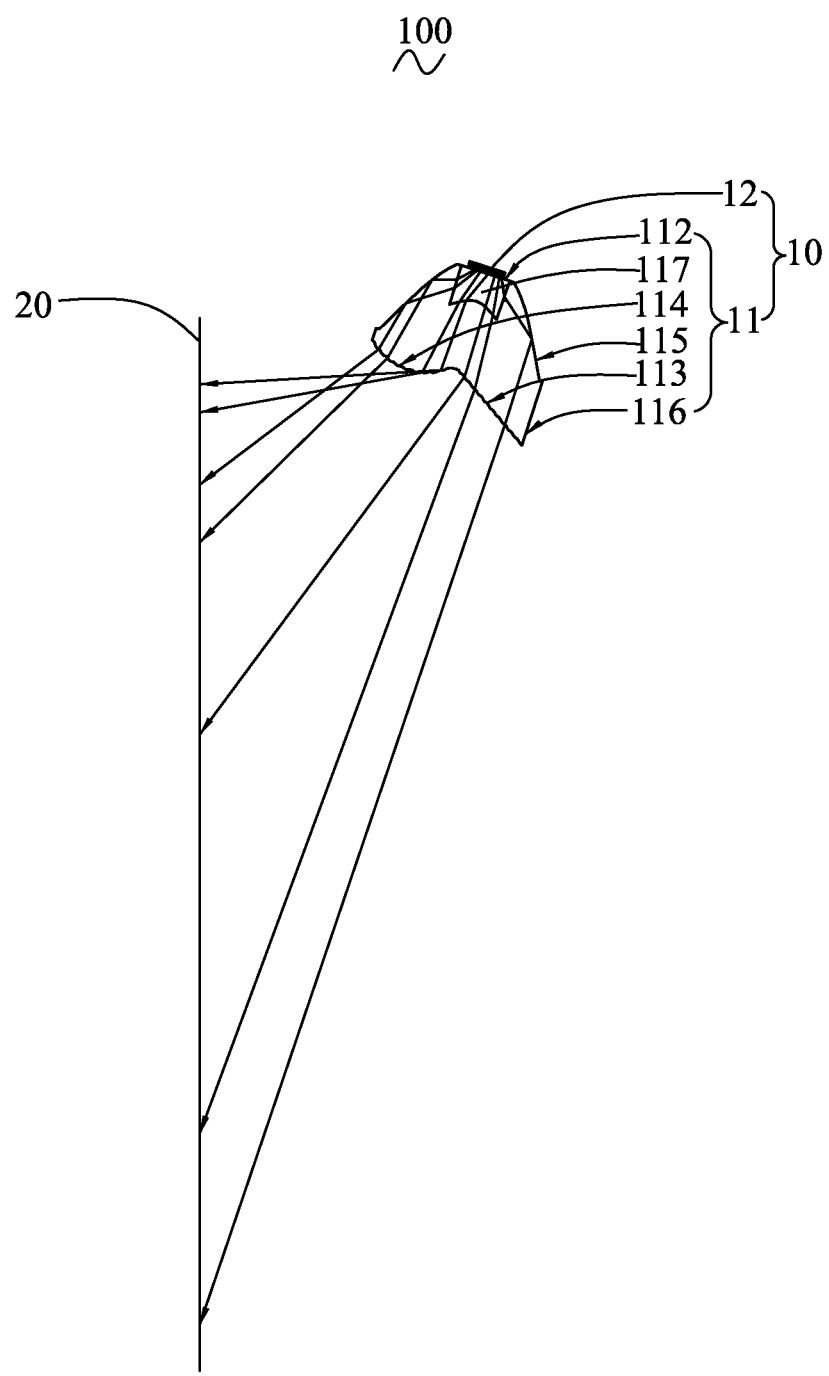
FIG. 1 is a light path view of an illumination system in accordance with a first embodiment of the disclosure.

Referring to FIG. 1, a light path view of an illumination system 100 according to a first embodiment is shown. The illumination system 100 includes at least a LED module 10, and at least an illuminated area 20 in response to each of the LED module 10. In actual applications, there may have many LED modules 10 which are determined by the quantity and the area of the illumination area 20. In the present embodiment, only for explaining the present disclosure, one LED module 10 and one illuminated area 20 are shown as example. Understandably, the illumination system 100 includes other components, such as house, base for mounting the LED module 10, cover, and power source for providing power to the LED module 10, and so on, but they need not be explained as they are well known by persons in the art.

Figure 2:
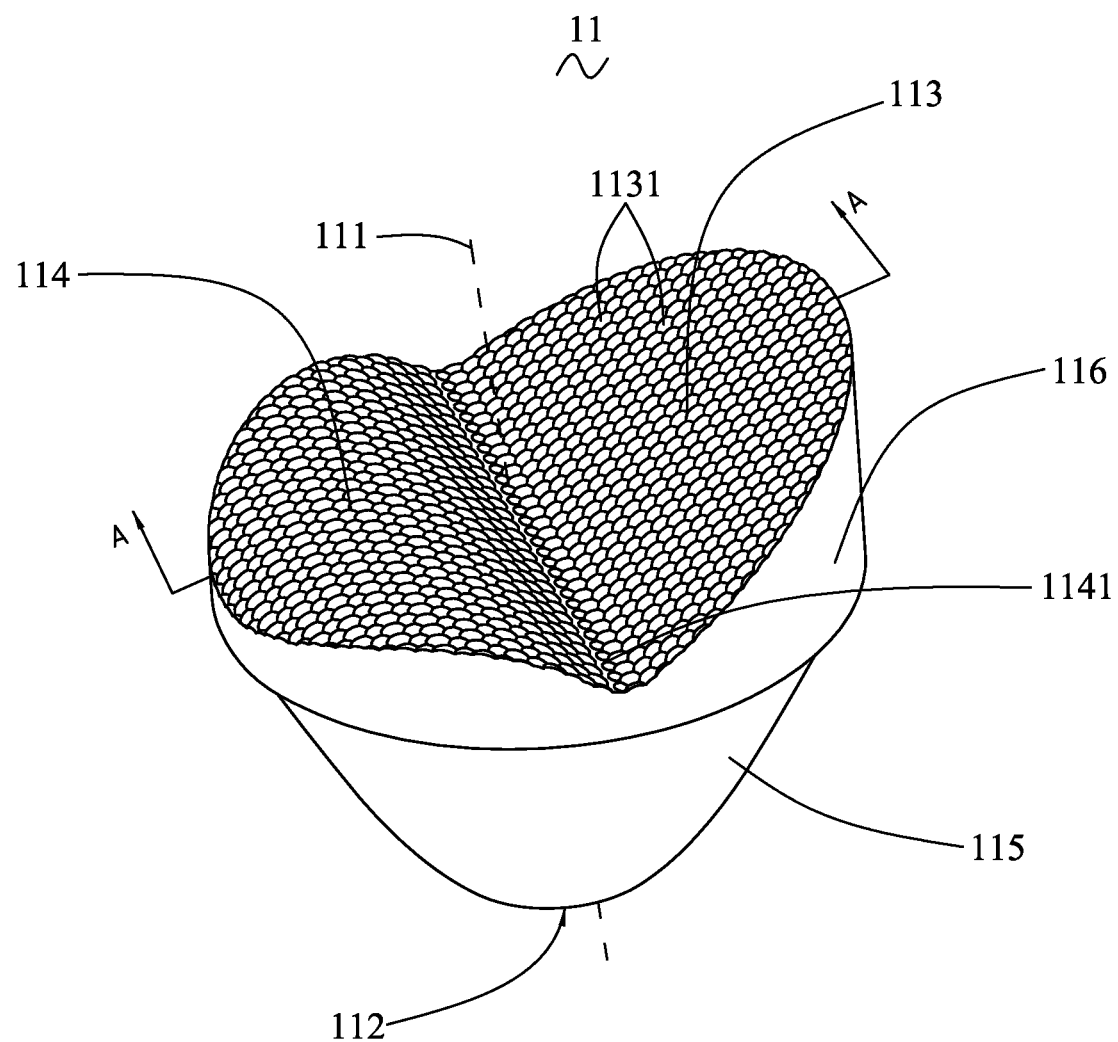
FIG. 2 is an isometric view of one lens of the illumination system of FIG. 1.

The LED module 10 includes a LED 12, and a lens 11 arranged on light path of the LED 12. Referring to FIG. 2, the lens 11 includes an optical axis 111, a light source recess 112 for receiving a light source, a first light emitting surface 113 facing to the light source recess 112, a second light emitting surface 114 intersecting with the first light emitting surface 113 and being on same side of the light source recess 112 with the first light emitting surface 113, a critical reflection surface 115 formed between the light source recess 112 and the first, second light emitting surfaces 113, 114, and a transitional surface 116 formed between the critical reflecting surface 115 and the first, second light emitting surfaces 113, 114.

The optical axis 111 is a universal feature for all of lens and used to dispose the light source, namely the LED 12. Moreover, the optical axis 111 is a guide for optic design.

The light source recess 112 is used for mounting the light source, such as the LED 12, or other traditional light source.

Figure 3A:
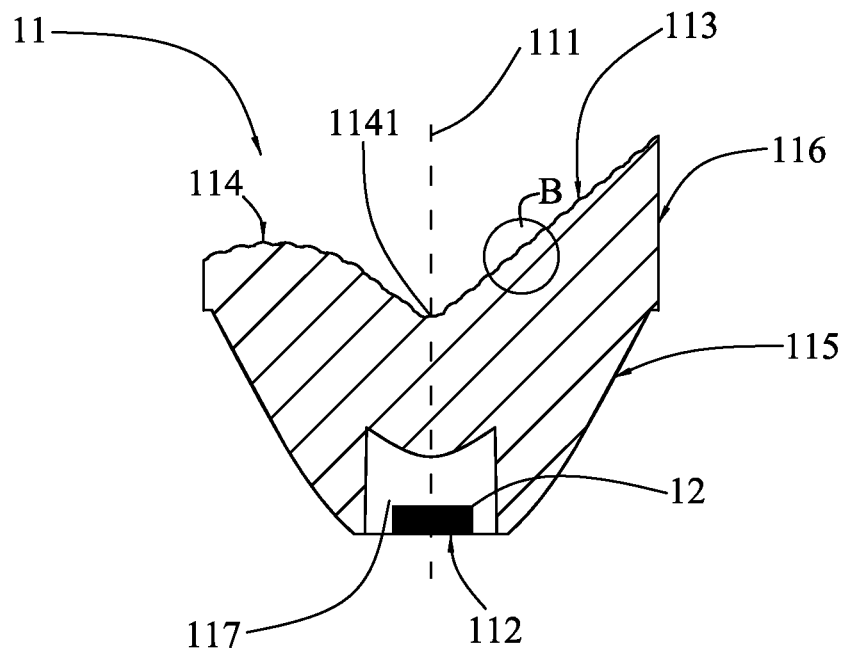
FIG. 3A and FIG. 3B are section views of a LED module having the lens of FIG. 2 taken along B-B line and an LED located at different positions.
Figure 3B:
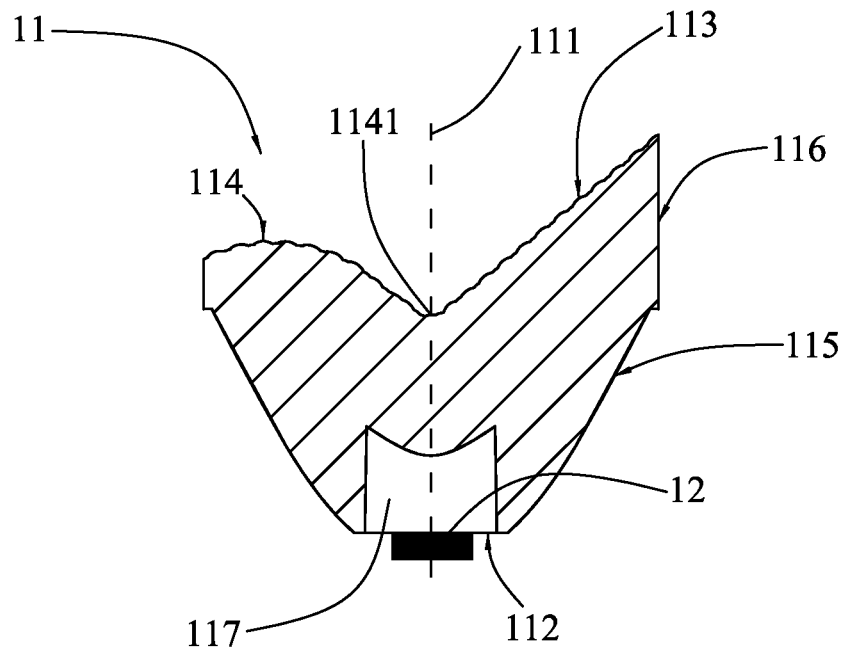

In the present embodiment, the light source is the LED 12. When dimension scale between the lens 11 and the light source is same as that between the lens 11 and the LED 12, the light source may be other traditional light source, such as incandescent or fluorescence lighting apparatuses, and so on. As shown in FIG. 3A and FIG. 3B, the LED 12 may be mounted into the light source recess 112 or at outer side of the light source recess 112. When the LED 12 is disposed into the light source recess 112, a bottom side of the LED 12 is flush with an end of the light source recess 112 for sufficiently taking advantage of the light emitted forward of the LED 12 and ease to assemble the lens 11 and the LED 12. When the LED 12 is mounted at outer side of the light source recess 112, a light emitting side of the LED 12 is flush with the end of the light source recess 112 for sufficiently taking advantage of the light emitted forward of the LED 12. In the present embodiment, the bottom side of the LED 12 is flush with the end of the light source recess 112. The light source recess 112 has a central axis which overlaps with the optical axis 111 of the lens 11 for ease to optic design.

Figure 5:
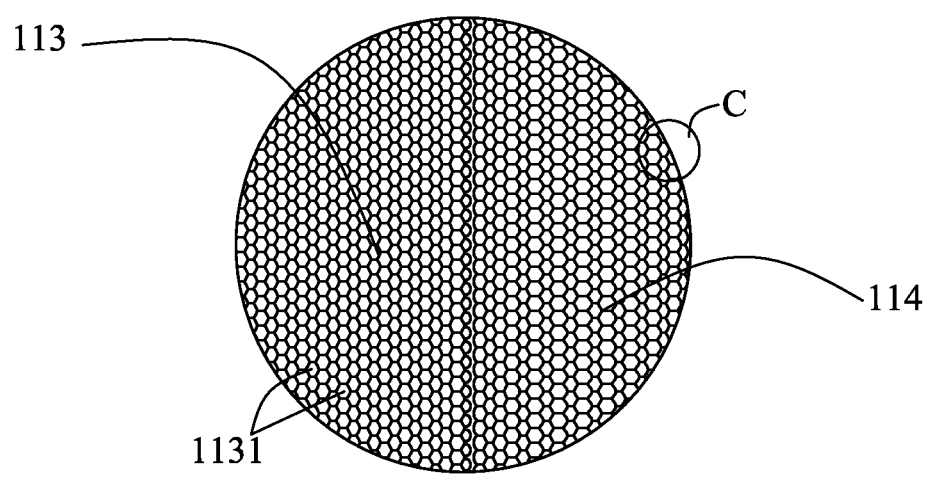
FIG. 5 is a plan view of the lens of FIG. 2.
Figure 6A:
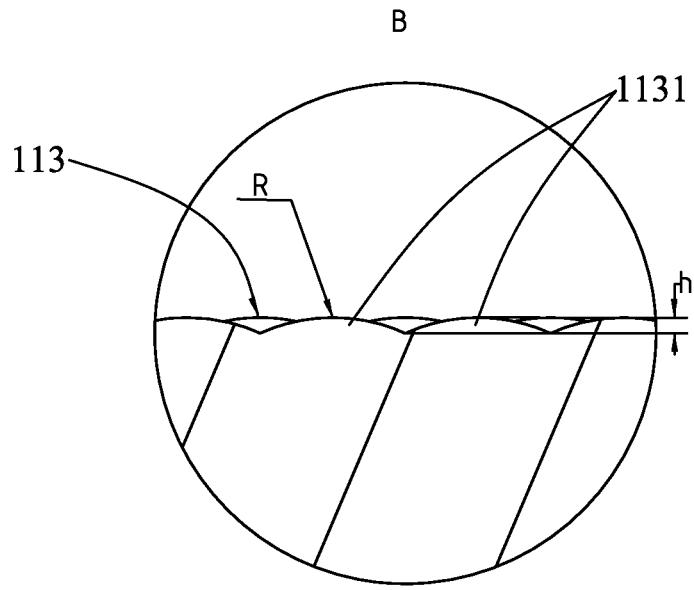
FIG. 6A and FIG. 6B are partially enlarged views of the lens of FIG. 3A at B and the lens of FIG. 5 at C.
Figure 6B:
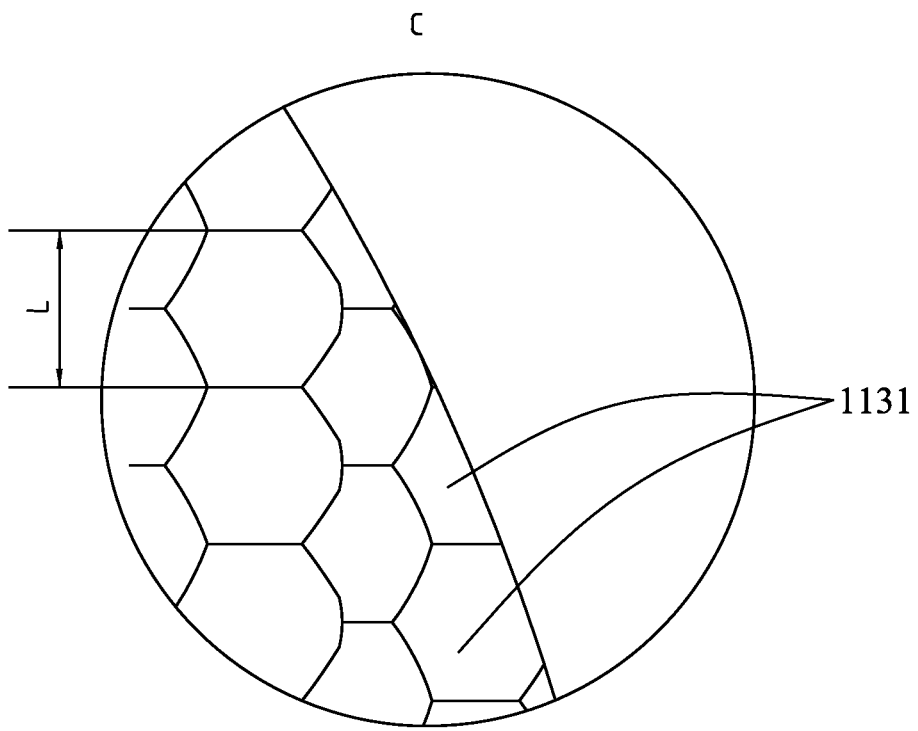

The first light emitting surface 113 is configured for refracting the light emitted forward of the LED 12 to illuminate a part of the illuminated area 20 which is farther to the LED module 10 and has a plan view or a cambered view. In order to control beam width of the light emitted forward of the LED 12 so as to form controlled illumination pattern on the illuminated area 20, a plurality of convex lenses 1131 are formed in the radial direction and in the circumferential direction around the LED 12 which is provided at the center thereof. As shown in FIG. 6A, it is a partially enlarged view of FIG. 3A at B, and shows a radius R and a height h of the convex lenses 1131. FIG. 6B, which is a partially enlarged view of FIG. 5 at C, shows as hexagonal shaped regions having a lateral dimensional L. The convex lenses 1131 have the radius R, the height h, and the lateral dimensional L which are designed according to beam wide of incident light. According to embodiment of the present invention, the convex lenses 1131 can be made to provide different beam widths by varying the parameters such as R, h, and L. For example, in one embodiment, a configuration with R=3.0 mm, h=0.1 mm, L=1.33 mm is used for a narrow beam having a beam width of about 12-17 degrees; R=2.0 mm, h=0.55 mm, and L=3.0 mm is used for a wide beam having a beam width of about 25-30 degrees.

The second light emitting surface 114 is on same side of the light source recess 112 with the first light emitting surface 113, and an intersecting line 1141 is formed between the first light emitting surface 113 and the second light emitting surface 114. Needed to further explain, the intersecting line 1141 may not be presented on the lens 11 in actual manufacture and is replace by an arc having certain curvature, as shown FIG. 5A and FIG. 5B. The second light emitting surface 114 is configured for refracting the light emitted forward of the LED 12 to illuminate another part of the illuminated area 20 which is closer to the LED module 10. As same as the first light emitting surface 113, a plurality of convex lenses are formed on the second light emitting surface 114 and have same configuration and operating principle. Understandably, when the illuminated area 20 has a wide area, the convex lenses on the first, second light emitting surface 113, 114 may be not formed thereon. The intersecting line 1141 has a cross point with the optical axis 111.

As shown in FIG. 3A and FIG. 3B, section views of the lens 11 are presented. The section view is taken along the optical axis 111 and perpendicular to the intersecting line 1141. A profile of the section has at least one tangent line thereon which has an acute angle with the optical axis 111 along the emitting orientation of the light emitting from the first, second light emitting surfaces 113, 114, and the profiles of the first, second light emitting surfaces 113, 114 are asymmetrical in shape to the optical axis 111 so as to make the first light emitting surface 113 have different light intensity with the second light emitting surface 114. In result, according to the above rules, at least three samples can be deduced out as shown in FIG. 3A, and FIG. 4A-FIG. 4D. Referring to FIG. 3A, the first light emitting surface 113 has a plan view and has at least one tangent line which has an acute angle with the optical axis 111 along the light emitting orientation. The second light emitting surface 114 has a cambered view and has a number of tangent lines which have acute angle or obtuse angle with the optical axis 111. As shown in FIG. 4A-FIG. 4D, at least one of the first, second light emitting surfaces 113, 114 has at least one tangent line which has an acute angle with the optical axis 111 along the light emitting orientation. In the present embodiment, the first light emitting surface 113 has a plan view, and the second light emitting surface 114 has a cambered view, such that the first light emitting surface 113 has a greater light intensity than the second light emitting surface 114.

The critical reflection surface 115 is formed an inclined surface like a mortar to reflecting the light emitted form the LED 12 into the first light emitting surface 113 and the second light emitting surface 114 and is designed to have an angle capable of reflecting the light emitted from the LED 12 onto the first light emitting surface 113 and the second light emitting surface 114.

The transitional surface 116 is formed between peripheries of the first, second light emitting surfaces 113, 114 and periphery of the critical reflection surface 115. The transitional surface 116 neither receives light nor reflect or refract light, only is configured for forming the first, second light emitting surfaces 113, 114.

The LED 12 is a semiconductor light source and transforms power into light. The LED 12 presents many advantages over traditional light sources including lower energy consumption, longer lifetime, improved physical robustness, smaller size, and faster switching. A center of the LED 12 is arranged on the optical axis 111 of the lens 11 for ease to optic design.

The illuminated area 20 is an object illuminated by the LED module 10 and may be a plan or a curve. In the present embodiment, only for explaining the configuration and principle of the disclosure, the illuminated area 20 is a plan and may be a picture exhibited in museum or selling goods placing in the freezer of supermarket, and so on. As shown in FIG. 1, when assembling the LED module 10, light emitted from the first light emitting surface 113 illuminate the illuminated area 20 which is farther to the LED module 10, while light emitted from the second light emitting surface 114 illuminate the illuminated area 20 which is closer to the LED module 10.

In use, the light emitted from the first light emitting surface 113 illuminate the illuminated area 20 which is farther to the LED module 10 after refracted by the first light emitting surface 113. The light emitted from the second light emitting surface 114 illuminate the illuminated area 20 which is closer to the LED module 10 after refracted by the second light emitting surface 114. Moreover, the intersecting line 1141 has a cross point with the optical axis 111, and the LED 12 is arranged in the optical axis 111, the first light emitting surface 113 may receive same light quantity than the second light emitting surface 114. However, since the profiles of the first, second light emitting surface 113, 114 are asymmetrical in shape to the optical axis 111, such that the first light emitting surface 113 has a greater light intensity than the second light emitting surface 114. In result, although the light emitted from the first light emitting surface 113 may have greater attenuation than the light emitted from the second light emitting surface 114 as the light emitted from the first light emitting surface 113 illuminate the illuminated area 20 which is farther to the LED module 10, light emitted from the first light emitting surface 113, which is farther to the illuminated are, can make up the intensity losses of attenuation as the first light emitting surface 113 have a greater light intensity than the second light emitting surface 114. As a result, the illumination pattern which is closer to the LED module 10 has basically same luminance with the illumination pattern which is farther to the LED module 10. That is to say, the illumination system 100 has basically uniform illumination pattern. In addition, the profile of section of the second light emitting surface 114 has a number of tangent lines which have acute angle and obtuse angle with the optical axis 111, therefore light received by the second light emitting surface 114 is scattered, which is contributed to reduce the light intensity of the light emitted from the second light emitting surface 114. Further, the light emitted from the first light emitting surface 113 may have more light quantity so as to make up the intensity losses of the attenuation. Here, "basically" means that when illuminance values measured by an illuminance meter at two sides of the illumination area 20, which is farther to and close to the LED module 10, are not absolutely equal. But it is difficult to distinguish for people to observe via naked eyes, therefore, the illuminated area 20 has a uniform illumination pattern for naked eye vision.

Figure 4A:
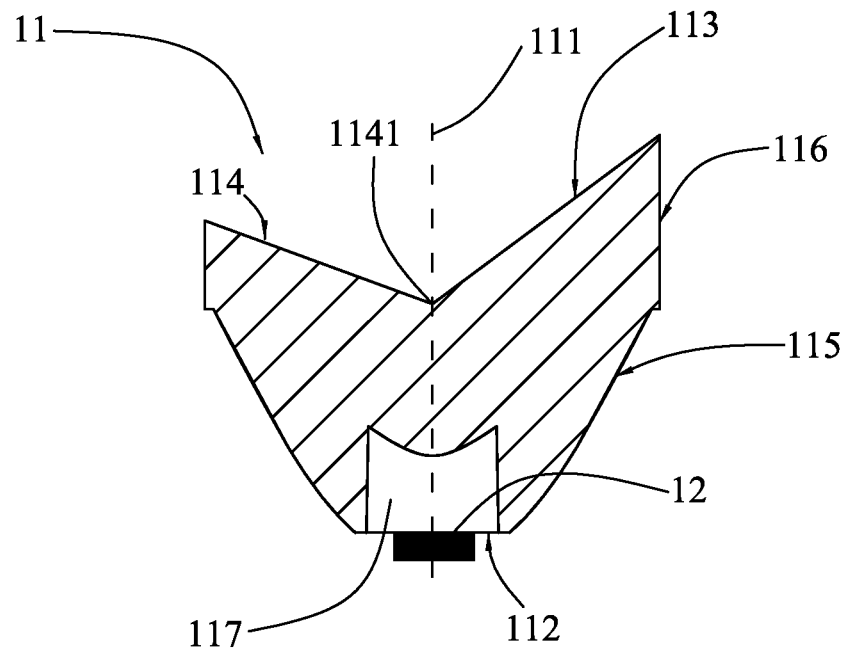
FIG. 4A-FIG. 4D are section views of the lens of the illumination system of FIG. 1 having different light emitting surface.
Figure 4B:
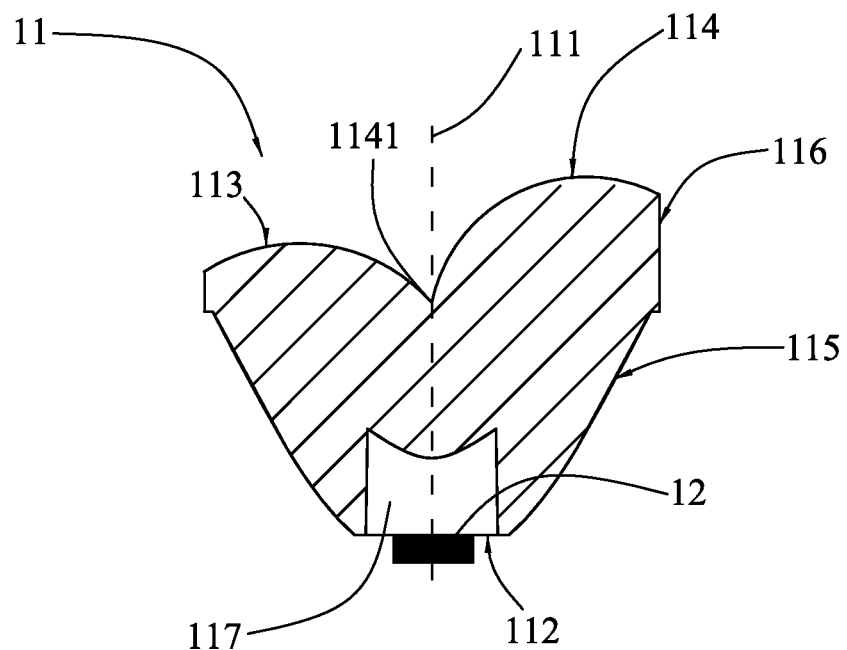
Figure 4C:
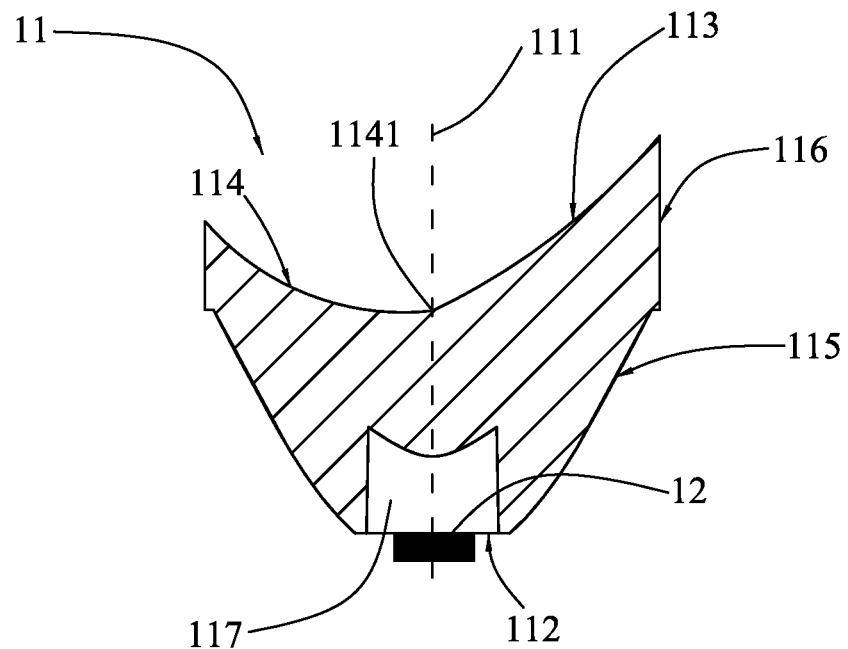
Figure 4D:
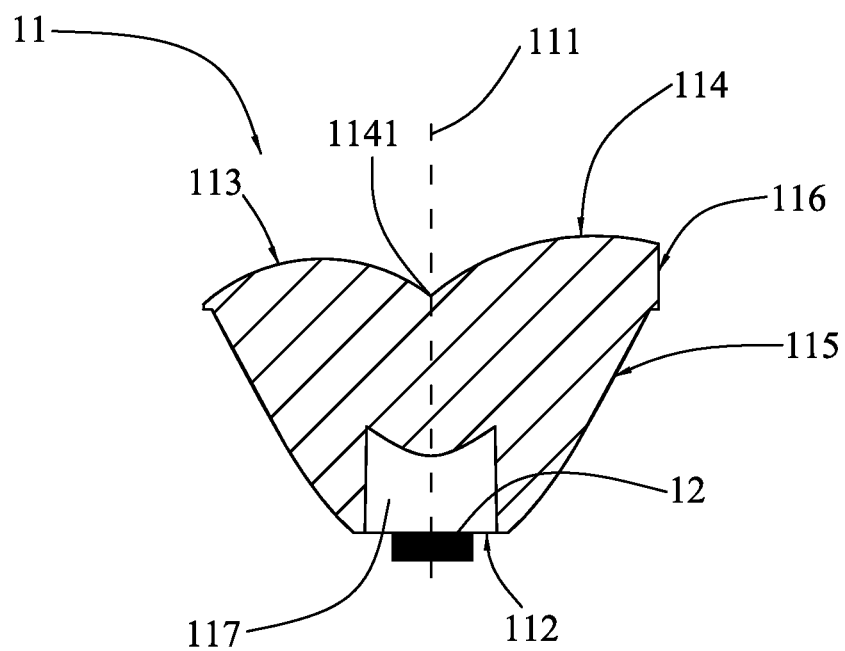
Figure 7:
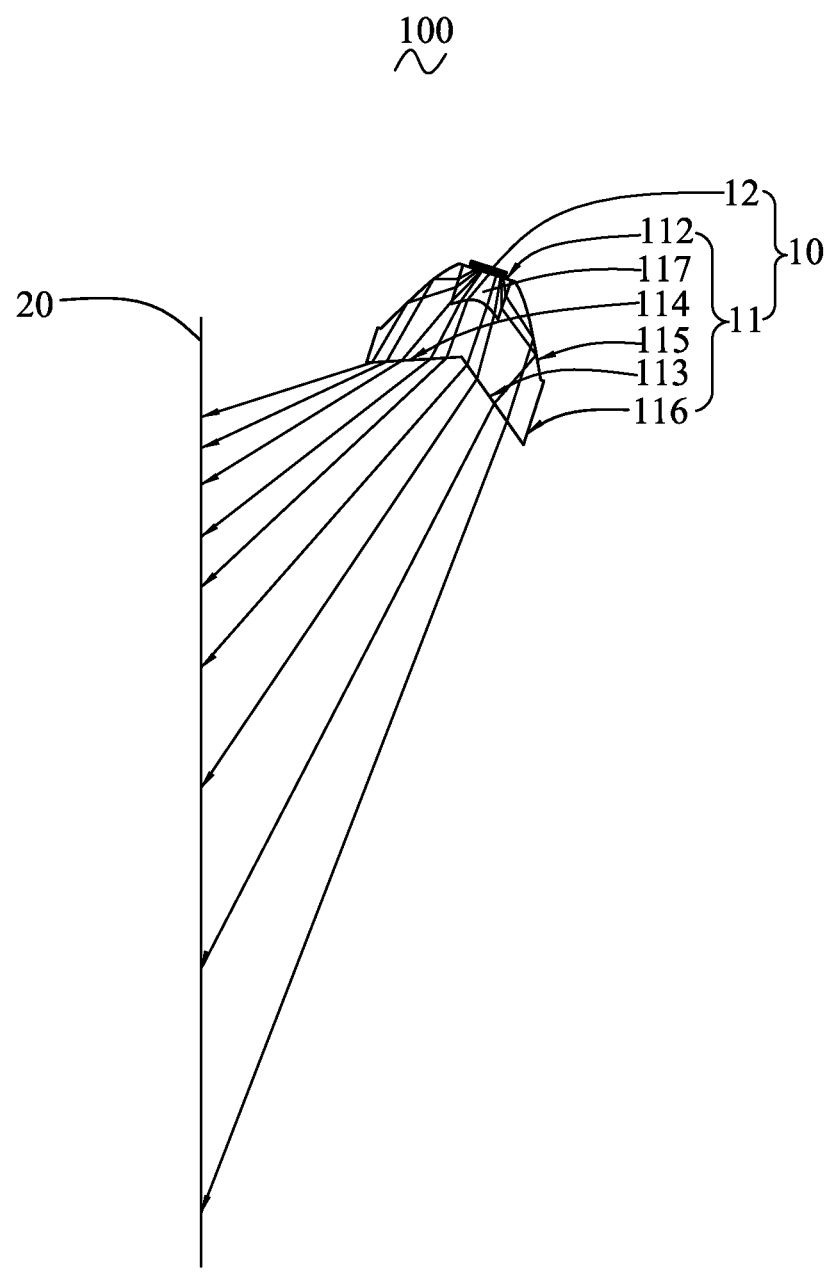
FIG. 7 is a light path view of the illumination system of FIG. 1 having the lens of FIG. 4A.
Figure 8:
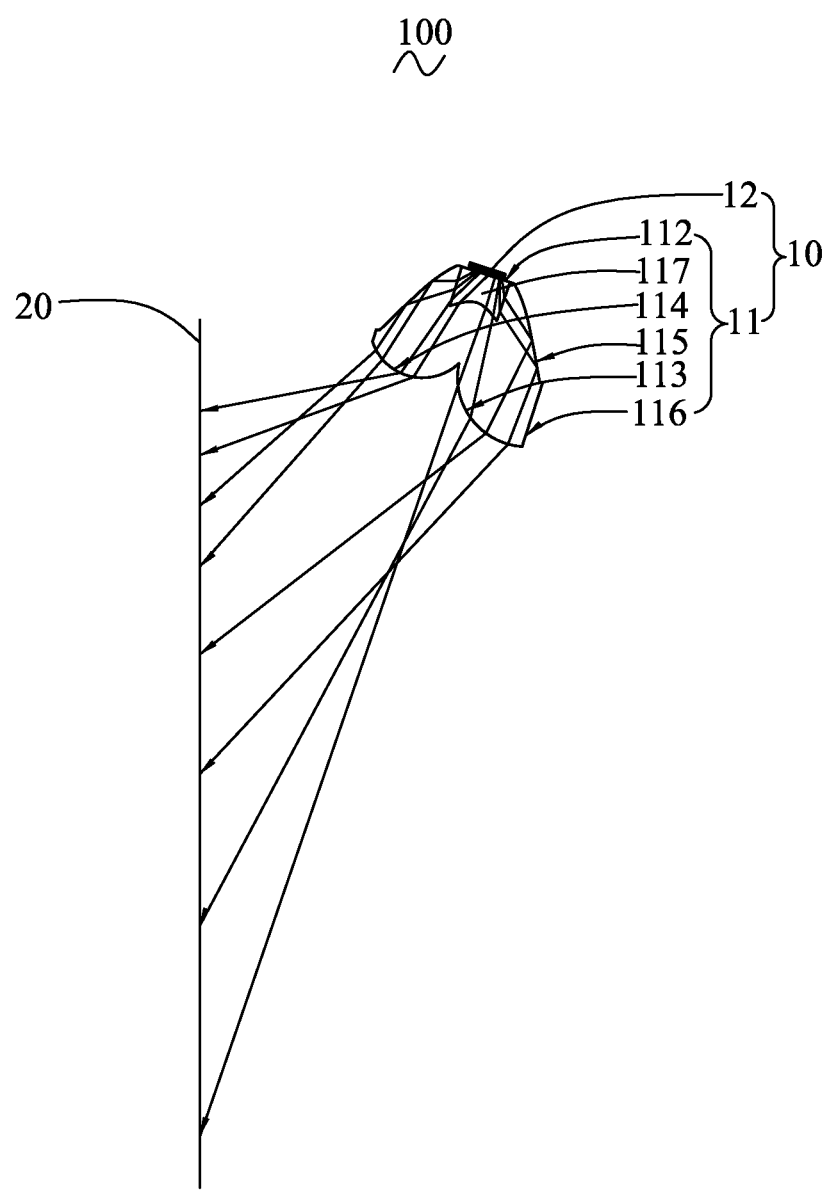
FIG. 8 is a light path view of the illumination system of FIG. 1 having the lens of FIG. 4B.

The light path of the illumination system 100 using the lens 11 of FIG. 4A is shown in FIG. 7. With regard to the lens 11 of FIG. 4A, the first, second light emitting surfaces 113, 114 have plan views. Since the profiles of the first, second light emitting surface 113, 114 are asymmetrical in shape to the optical axis 111, the first light emitting surface 113 may have a greater light intensity than the second light emitting surface 114. In result, although the light emitted from the first light emitting surface 113 may have greater attenuation than the light emitted from the second light emitting surface 114 as the light emitted from the first light emitting surface 113 illuminate the illuminated area 20 which is farther to the LED module 10, light emitted from the first light emitting surface 113 can make up the intensity losses of attenuation as the first light emitting surface 113 receives more light quantity than the second light emitting surface 114. As a result, the illumination pattern which is closer to the LED module 10 has basically same luminance with the illumination pattern which is farther to the LED module 10. That is to say, the illumination system 100 have basically uniform illumination pattern.

The light path of the illumination system 100 using the lens 11 of FIG. 5B is shown in FIG. 7. With regard to the lens 11 of FIG. 4B, the first, second light emitting surfaces 113, 114 have cambered view. The light emitted from the cambered view is scattered. Therefore, the first, second light emitting surface 113, 114 have different light quantity. In result, the farther side and close side of the illuminated area 20 related to the LED module 10 have basically uniform illumination pattern.

Figure 9:
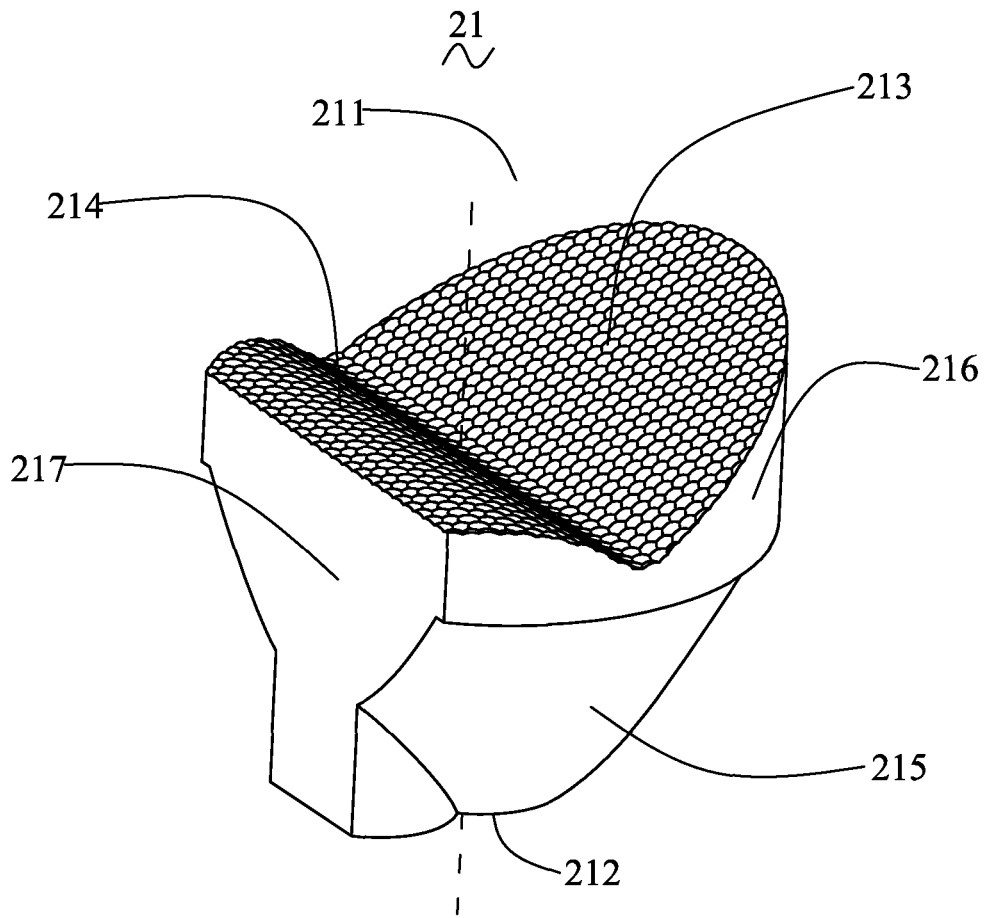
FIG. 9 is an isometric view of a lens in accordance with second embodiment of the disclosure.

Referring to FIG. 9, a lens 21 according to a second embodiment is shown. The lens 21 includes an optical axis 211, a light source recess 212 for receiving a light source, a first light emitting surface 213 facing to the light source recess 212, a second light emitting surface 214 intersecting with the first light emitting surface 213 and being on same side of the light source recess 212 with the first light emitting surface 213, a critical reflection surface 215 formed between the light source recess 212 and the first, second light emitting surfaces 213, 214, a transitional surface 216 formed between the critical reflecting surface 215 and the first, second light emitting surfaces 213, 214, and a third light emitting surface 217 formed between the light source recess 212 and the second light emitting surface 216.

The optical axis 211, the light source recess 212, the first, second light emitting surfaces 213, 214, and the critical reflection surface 215 have same configuration and work principle with that of the lens 11 of the first embodiment. Therefore, the detailed description is omitted.

Figure 10A:
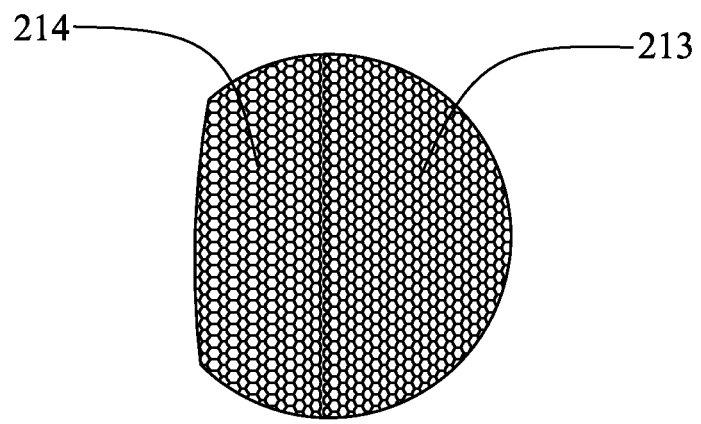
FIG. 10A-FIG. 10C are plan views of the lens of FIG. 9 which have different curvature relate to an optical axis thereof.
Figure 10B:
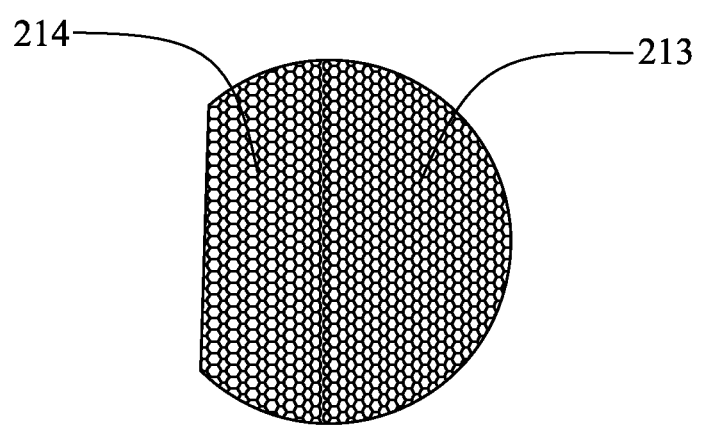
Figure 10C:
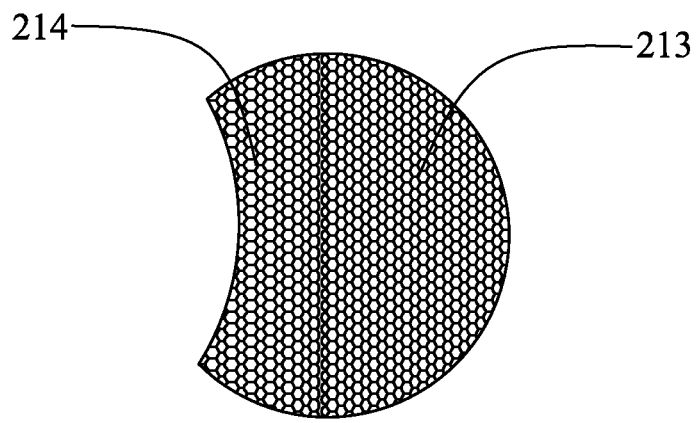
Figure 11:
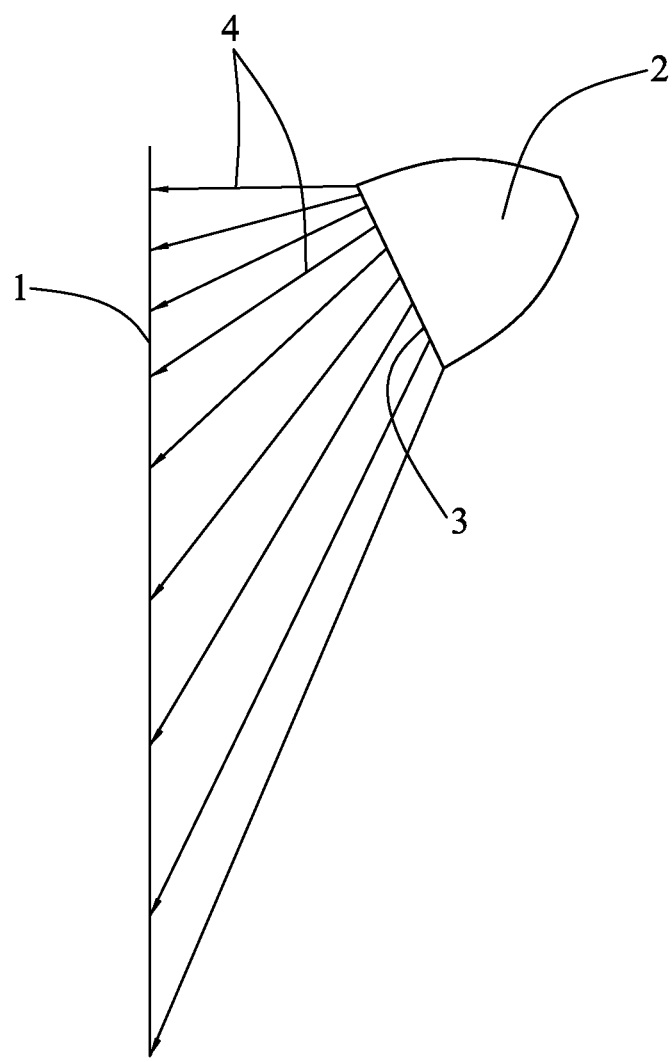
FIG. 11 is a light path view of a traditional illumination system in prior art.

The third light emitting surface 217 extends from the light source recess 212 to the second light emitting surface 214, and light emitted from the third emitting surface 217 illuminate the illuminated area which is closer to the LED module. According to optic distribution design, the third light emitting surface 217 may have a plan view or a cambered view. Namely, the third light emitting surface 217 may have a positive curvature or a negative curvature related to the optical axis 212. FIG. 10A, FIG. 10B, and FIG. 10C respectively show three style of the third light emitting surface 217. In the present embodiment, the third light emitting surface 217 has a cambered view having a positive curvature related to the optical axis 111. In the plan views of FIG. 10A, FIG. 10B, and FIG. 10C, the third light emitting surface 217 has an intersecting line with the second light emitting surface 214 and a tangent line of the intersecting line in peak is parallel to an intersecting line of the first, second light emitting surfaces 213, 214 in order to insure maximum light quantity to illuminate the illuminated area. For changing light emitting orientation of the third light emitting surface 217, a profile of section of the third light emitting surface 217 along the optical axis 211 may be parallel to the optical axis 211 or have an inclined angle with the optical axis 211. In addition, the third light emitting surface 217 may be spaced with the light source recess 212 or passes through the light source recess 212 so as to control the light quantity thereof. The third light emitting surface 217 is configured for enlarging the illumination pattern of the illuminated area.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens having an optical axis and a light source recess for disposing a light source, the lens further comprising:
   a first light emitting surface facing to the light source recess; and
   a second light emitting surface intersecting with the first light emitting surface and being on same side of the light source recess with the first light emitting surface, an intersecting line formed between the first light emitting surface and the second light emitting surface, and having a cross point with the optical axis, a profile of section of the first, second light emitting surface, which is taken along the optical axis and perpendicular to the intersecting line, having at least one tangent line which has an acute angle with the optical axis along the emitting orientation of the light emitted from the first, second light emitting surface, the profiles of the first, second light emitting surface being asymmetrical in shape to the optical axis.

2. The lens of claim 1, wherein the first light emitting surface has a plan view or comprises at least a concave surface.

3. The lens of claim 1, wherein the second light emitting surface has a plan view or a cambered view.

4. The lens of claim 1, wherein the first light emitting surface and the second light emitting surface have a plurality of convex lenses disposed thereon, each of the convex lenses have a radius, a height and a lateral dimensional which are designed according to beam wide of incident light.

5. The lens of claim 1, wherein the lens further comprises a critical reflecting surface formed between the first, second light emitting surface and the light source recess, a transitional surface is formed between the critical reflecting surface and the first, second light emitting surface.

6. The lens of claim 1, wherein the light source recess has a central axis which overlaps with an optical axis of the lens.

7. The lens of claim 1, wherein the lens further comprises a third light emitting surface formed between the second light emitting surface and the light source recess and extending from the light source recess to the second light emitting surface.

8. The lens of claim 7, wherein the third light emitting surface has an intersecting line with the second light emitting surface and a tangent line of the intersecting line in peak is parallel to the intersecting line of the first, second light emitting surfaces.

9. An LED module having at least an LED, and at least a lens mounted in the light path of one LED, the lens comprising:
an optical axis;
a light source recess for disposing a light source;
a first light emitting surface facing to the light source recess; and
a second light emitting surface intersecting with the first light emitting surface and being on same side of the light source recess with the first light emitting surface, an intersecting line formed between the first light emitting surface and the second light emitting surface, and having a cross point with the optical axis, a profile of section of the first, second light emitting surface, which is taken along the optical axis and perpendicular to the intersecting line, having at least one tangent line which has an acute angle with the optical axis along the emitting orientation of the light emitted from the first, second light emitting surface, the profiles of the first, second light emitting surface being asymmetrical in shape to the optical axis.

10. The LED module of claim 9, wherein the first light emitting surface has a plan view or comprises at least a concave surface.

11. The LED module of claim 9, wherein the second light emitting surface has a plan view or a cambered view.

12. The LED module of claim 9, wherein the first light emitting surface and the second light emitting surface have a plurality of convex lenses disposed thereon, each of the convex lenses have a radius, a height and a lateral dimensional which are designed according to beam wide of incident light.

13. The LED module of claim 9, wherein the lens further comprises a critical reflecting surface formed between the first, second light emitting surface and the light source recess, a transitional surface is formed between the critical reflecting surface and the first, second light emitting surface.

14. The LED module of claim 9, wherein the lens further comprises a third light emitting surface formed between the second light emitting surface and the light source recess and extending from the light source recess to the second light emitting surface.

15. The LED module of claim 9, wherein the third light emitting surface has an intersecting line with the second light emitting surface and a tangent line of the intersecting line in peak is parallel to the intersecting line of the first, second light emitting surfaces.

16. A illumination system comprising:
an illuminated area; and
at least one LED module, the LED module comprising:
at least an LED; and
at least a lens mounted in the light path of one LED, the lens comprising:
an optical axis;
a light source recess for disposing a light source;
a first light emitting surface facing to the light source recess; and
a second light emitting surface intersecting with the first light emitting surface and being on same side of the light source recess with the first light emitting surface, an intersecting line formed between the first light emitting surface and the second light emitting surface, and having a cross point with the optical axis, a profile of section of the first, second light emitting surface, which is taken along the optical axis and perpendicular to the intersecting line, having at least one tangent line which has an acute angle with the optical axis along the emitting orientation of the light emitted from the first, second light emitting surface, the profiles of the first, second light emitting surface being asymmetrical in shape to the optical axis.

17. The illumination system of claim 16, wherein light emitted from the first light emitting surface illuminating the illuminated area which is farther to the LED module, while light emitted from the second light emitting surface illuminating the illuminated area which is closer to the LED module.

18. The illumination system of claim 16, wherein the lens further comprises a third light emitting surface formed between the light source recess and the second light emitting surface and extending from the light source recess to the second light emitting surface.

19. The illumination system of claim 18, wherein the third light emitting surface has an intersecting line with the second light emitting surface and a tangent line of the intersecting line in peak is parallel to the intersecting line of the first, second light emitting surfaces.

* * * * *